(12) United States Patent
Gomila

(10) Patent No.: US 7,693,338 B2
(45) Date of Patent: Apr. 6, 2010

(54) TECHNIQUE FOR DEFINING CONCEALMENT ORDER TO MINIMIZE ERROR PROPAGATION

(75) Inventor: Cristina Gomila, Princeton, NJ (US)

(73) Assignee: Thomson Licensing, Boulogne Billancourt (FR)

( * ) Notice: Subject to any disclaimer, the term of this patent is extended or adjusted under 35 U.S.C. 154(b) by 1150 days.

(21) Appl. No.: 10/541,762

(22) PCT Filed: Dec. 30, 2003

(86) PCT No.: PCT/US03/41628

§ 371 (c)(1),
(2), (4) Date: Jul. 11, 2005

(87) PCT Pub. No.: WO2004/063853

PCT Pub. Date: Jul. 29, 2004

(65) Prior Publication Data

US 2006/0288264 A1    Dec. 21, 2006

Related U.S. Application Data

(60) Provisional application No. 60/439,297, filed on Jan. 10, 2003.

(51) Int. Cl.
*G06K 9/36* (2006.01)

(52) U.S. Cl. ...................................................... 382/236

(58) Field of Classification Search ................... 382/309, 382/236, 232–233; 375/240.12–240.29; 714/3, 8, 100, 758, 746, 774, 799
See application file for complete search history.

(56) References Cited

U.S. PATENT DOCUMENTS

| | | | |
|---|---|---|---|
| 5,550,640 A | 8/1996 | Tsuboi et al. | |
| 6,990,151 B2 * | 1/2006 | Kim et al. | 375/240.27 |
| 2003/0012285 A1 | 1/2003 | Kim | |
| 2003/0039312 A1 | 2/2003 | Horowitz et al. | |
| 2003/0063806 A1 | 4/2003 | Kim et al. | |

FOREIGN PATENT DOCUMENTS

WO    2002/071736 A2    9/2002

OTHER PUBLICATIONS

Search Report Dated July 9, 2004.

* cited by examiner

*Primary Examiner*—Sherali Ishrat
(74) *Attorney, Agent, or Firm*—Robert D. Shedd; Robert B. Levy

(57) ABSTRACT

Concealment of macroblocks in a rectangular array advantageously occurs by concealing successive rows of macroblocks by progressing in the direction of the larger side of the array. By performing concealment in this manner, information from the concealment of a preceding row or column propagates in a way that facilitates the prediction of contours either in the vertical, the horizontal or the diagonal direction horizontal/diagonal direction, thereby improving the quality of concealment.

15 Claims, 2 Drawing Sheets

TECHNIQUE FOR DEFINING CONCEALMENT ORDER TO MINIMIZE ERROR PROPAGATION

This application claims the benefit, under 35 U.S.C. § 365 of International Application PCT/US03/41628, filed Dec. 30, 2003, which was published in accordance with PCT Article 21(2) on Jul. 29, 2004 in English and which claims the benefit of U.S. provisional patent application No. 60/439,297, filed Jan. 10, 2003.

TECHNICAL FIELD

This invention relates to a technique for establishing the order of concealment of macroblocks having lost and/or corrupted data.

BACKGROUND ART

In many instances, video streams undergo compression (coding) to facilitate storage and transmission. Not infrequently, such coded video streams incur data losses or become corrupted during transmission because of channel errors and/or network congestion. Upon decoding, the loss/corruption of data manifests itself as missing pixel values within one or more macroblocks within the decoded image. To reduce artifacts attributable to such missing/corrupted pixel values, a decoder will "conceal" such missing/corrupted pixel values by estimating the values from other macroblocks in the same image or from another image. The term conceal is a somewhat of a misnomer because the decoder does not actually hide missing or corrupted pixel values.

Spatial concealment seeks to derive the missing/corrupted pixel values by using pixel values from other areas in the same image in reliance on the similarity between neighboring regions in the spatial domain. In contrast to spatial error concealment, temporal concealment attempts the recovery of the coded motion information, namely the reference picture indices and the motion vectors, to estimate the missing pixel values from at least one previously transmitted macroblock. When the errors do not affect isolated macroblocks but groups of contiguous macroblocks, concealing errors can require using information from already concealed blocks. The concealment of lost slices, as defined in the Main Profile of the ISO/ITU H.264 standard for video compression, exemplifies a typical situation requiring the use of information from previously concealed macroblocks. However, such a strategy tends to propagate errors and compromises the quality of the restored image.

One approach to overcoming this difficulty proposes to conceal entire columns of macroblocks, progressing inwards from the boundaries of the image towards the center. The macroblocks on the left and the macroblocks on the right undergo concealment independently of each other. Similarly, concealment within each column progresses independently up and down until the concealed macroblocks meet in the middle. This approach reduces error propagation by concealing the center of the image, which is typically difficult to predict but is visually important, at the end of the process. However, accomplishing concealment in this manner reduces the ability to propagate meaningful information from left to right and vice versa. Macroblocks on the left side of the image are predicted with no information coming from the right and vice versa. Such behavior makes the propagation of diagonal contours across the missing region difficult.

Thus, there is a need for a technique that accomplishes error concealment while overcoming the aforementioned drawback.

BRIEF SUMMARY OF THE INVENTION

Briefly, in accordance with the present principles, concealment of macroblocks in a rectangular array occurs by concealing the macroblocks having missing/corrupted values by progressing in the direction of one of the two larger sides of the array. Thus, for example, for a rectangular array having a greater width than height, concealment progresses by rows. Conversely, for a rectangular array that has a greater height than width, concealment progresses by columns. (For a square array, concealment can progress arbitrarily by rows or by columns.) The concealment of macroblocks by progressing in the direction of one of the two larger sides of the array facilitates the prediction of contours either in the vertical, horizontal or diagonal direction, thereby improving the quality of concealment in contrast to prior art concealment techniques that progressively conceal in a given direction irrespective of the dimensions of the array.

DETAILED DESCRIPTION

Figure 1:
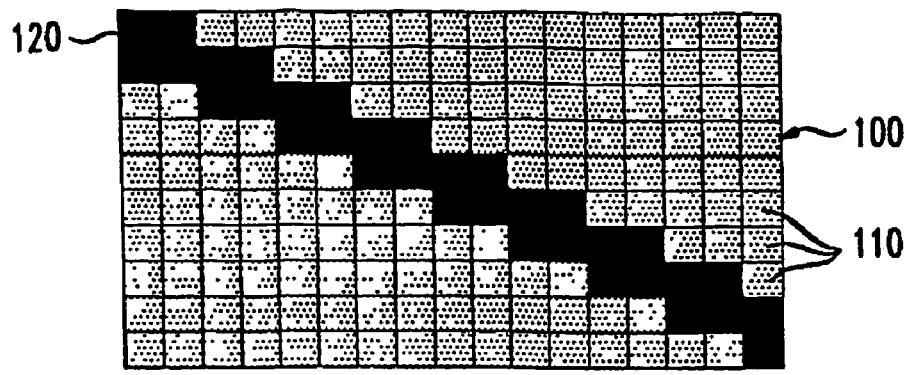
FIG. 1 illustrates an image partitioned into macroblocks.

Block-based video compression techniques, such as embodied in the proposed ISO/ITU H.264 video compression standard, operate by dividing a picture into slices, each slice comprising a set of macroblocks or macroblock pairs, with each macroblock coded in accordance with the standard. A macroblock typically comprises a squared region of 16×16 pixels. For coding purposes, macroblocks can be further partitioned into sub-macroblocks not necessarily squared. Each one of the sub-macroblocks can have different coding modes when the macroblock is encoded. FIG. 1 depicts the partitioning of an original picture 100 into macroblocks 110. Note that the number of macroblocks within the picture 100 can vary depending on its size.

Figure 2:
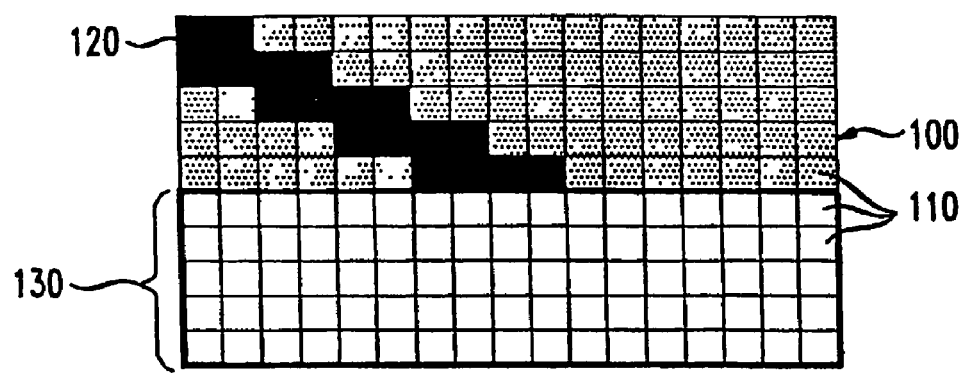
FIG. 2 illustrates the image of FIG. 1 after undergoing decoding when the image was previously coded and transmitted over an error-prone channel, with errors in the channel causing the loss of a rectangular array of macroblocks.
Figure 3:
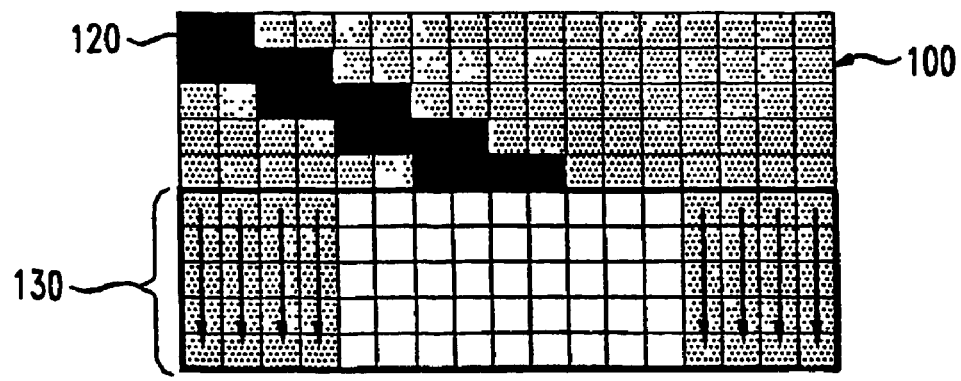
FIG. 3 illustrates the image of FIG. 2 during error concealment that progresses vertically by columns from the outer edges to the center of the image in accordance with the teachings of the prior art.
Figure 4:
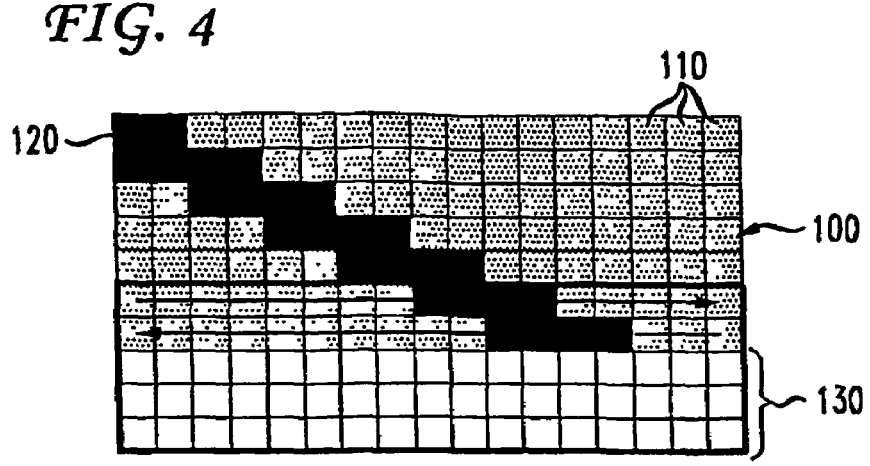
FIG. 4 illustrates the image of FIG. 2 during error concealment that progresses horizontally by rows in accordance with the present principles.

In the illustrated embodiment, the picture 100 has a black stripe 120 that extends diagonally from the upper left-hand corner to the lower right-hand corner of the picture. The remaining portion of the picture 100 has a gray level for purposes of illustration. To facilitate transmission, the picture 100 will typically undergo coding, typically by any of several well-known block-based coding techniques, such as the technique described in the proposed ISO/ITU H.264 standard. During the transmission of the coded picture 100, one or more macroblocks 110 can become corrupted. In other words, the pixel values carried by such a macroblock 110 will become lost or tainted. An example of such a situation appears in FIG. 2 which illustrates the picture 100 following decoding. The decoded picture 100 in FIG. 2 has a number of rows of macroblocks with missing pixel values, all of which lie in a rectangular error region 130. For ease of illustration, the macroblocks 110 with missing pixel values appear in white in FIG. 2, as contrasted by those macroblocks with intact pixel values which appear either dark or gray, To assure optimal performance, a non-rectangular error region should be divided into rectangular sub-regions prior to undergoing concealment. Undertaking error concealment in accordance with the present principles on rectangular error regions, such as the error region 130 of FIG. 4 assures a symmetrical progression from the top-most and the bottom-most row (equivalently, from the left-most and the right-most columns). If the error region has larger width than height, division into rectangular sub-regions is done in order that each sub-region has the upper-most and the lower-most rows neighboring correctly received rows. Should the error region have a larger height than width, division into rectangular sub-regions is done in order that each sub-region has the left-most and the right-most rows neighboring correctly received columns.

Figure 5:
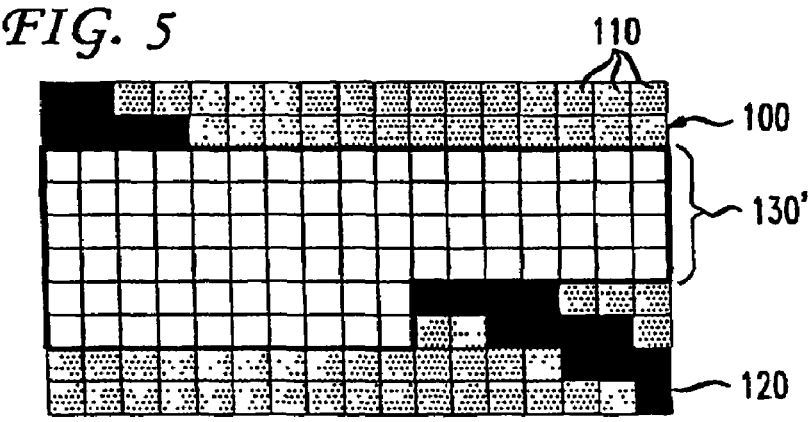
FIG. 5 illustrates the image of FIG. 1 after undergoing decoding when the image was previously coded and transmitted over an error-prone channel, with errors in the channel causing the loss of a non-rectangular array of macroblocks.
Figure 6:
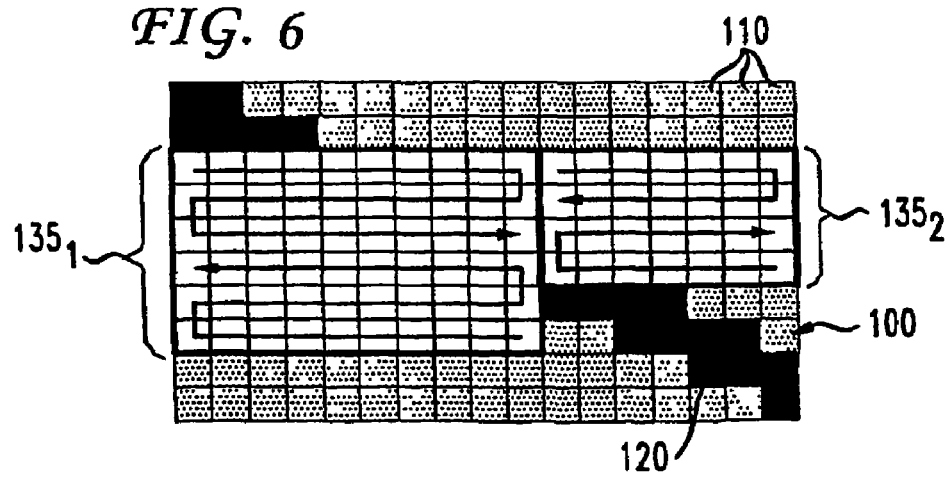
FIG. 6 illustrates a partition of the non-rectangular array of lost macroblocks of FIG. 5 into two rectangular sub-regions to enable error concealment in accordance with the present principles.

To better appreciate the process of partitioning a non-rectangular error region, refer to FIG. 5, which depicts the picture 100 of FIG. 1 after decoding when the image prior to decoding has undergone transmission through an error-prone channel causing resultant errors. Such errors manifest themselves in the picture 100 of FIG. 5 in the form of a non-rectangular error region 130'. In accordance with the present principles, the non-rectangular error region 130' undergoes partitioning into two or more rectangular sub-regions, depicted as sub-regions $135_1$ and $135_2$ in FIG. 5, with each sub-region having its upper and lower most rows bordering a correctly received row of macroblocks. Thereafter, the macroblocks in each of the sub-regions $135_1$ and $135_2$ undergo concealment, by alternately scanning the rows of macroblocks in each of the sub-regions in opposite directions as depicted by the serpentine arrows within each sub-region.

The foregoing describes a technique that establishes an order of concealment of macroblocks in a rectangular array that facilitates the prediction of contours either in the vertical, horizontal or diagonal direction, thereby improving the quality of concealment.

The invention claimed is:

1. A method for establishing the concealment order of macroblocks in a rectangular array of having opposed sides, comprising the step of:

concealing the macroblocks having at least one of a missing or corrupted pixel values by first progressing along one of a row or column in a first direction parallel of one of the larger of the sides of the array and then proceeding in a perpendicular direction to a next one of a row or column to progress there along in the first direction.

2. The method according to claim 1 comprising the step of progressively concealing in opposite directions towards each of the two larger sides of the array until reaching a central portion of the array.

3. A method of concealing macroblocks in a rectangular array of N rows and M columns where N is smaller than M, comprising the step of:

concealing macroblocks having at least one of a missing or corrupted pixel values by progressing horizontally along a first and then proceeding in one of a top-down or bottom up directions to progress horizontally along a second row.

4. The method according to claim 3 wherein concealment progresses horizontally by rows simultaneously in a top-down direction and in a bottom-up direction.

5. The method according to claim 3 wherein concealment progresses horizontally by rows exclusively in a top-down direction.

6. The method according to claim 3 wherein concealment progresses horizontally by rows exclusively in a bottom-up direction.

7. The method according to claim 3 wherein macroblocks in each row are scanned in one of a left-to-right direction and a right-to-left direction.

8. The method according to claim 7 where the macroblocks in successive rows are alternately scanned from left-to-right and right-to-left.

9. The method according to claim 3 wherein the macroblocks in all rows are concealed from left-to-right.

10. The method according to claim 3 wherein the macroblocks in all rows are concealed from right-to-left.

11. The method according to claim 5 wherein macroblocks are concealed in even rows from left-to-right.

12. The method according to claim 5 wherein macroblocks are concealed in odd rows from right-to-left.

13. The method according to claim 5 wherein macroblocks are concealed in even rows from right-to-left.

14. The method according to claim 5 wherein macroblocks are concealed in odd rows from left-to-right.

15. The method according to claim 3 further comprising the steps of:

arranging a non-rectangular array of macroblocks having missing/corrupted pixel values into at least two rectangular sub-arrays of macroblocks prior to undertaking concealment, and concealing each of sub-arrays independently.

* * * * *